(12) United States Patent
Yang et al.

(10) Patent No.: US 9,203,643 B2
(45) Date of Patent: Dec. 1, 2015

(54) METHODS AND APPARATUSES FOR RAPID TRILL CONVERGENCE THROUGH INTEGRATION WITH LAYER TWO GATEWAY PORT

(71) Applicant: Cisco Technology, Inc., San Jose, CA (US)

(72) Inventors: Yibin Yang, San Jose, CA (US); Chiajen Tsai, Cupertino, CA (US); Patnala Debashis Rao, Cupertino, CA (US); Yuchen Zhou, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 565 days.

(21) Appl. No.: 13/644,100

(22) Filed: Oct. 3, 2012

(65) Prior Publication Data

US 2014/0092780 A1    Apr. 3, 2014

(51) Int. Cl.
*H04L 12/801* (2013.01)
*H04L 12/26* (2006.01)
*H04L 12/24* (2006.01)
*H04L 12/721* (2013.01)
*H04L 12/753* (2013.01)
*H04L 12/46* (2006.01)

(52) U.S. Cl.
CPC .............. *H04L 12/462* (2013.01); *H04L 45/48* (2013.01); *H04L 45/66* (2013.01)

(58) Field of Classification Search
CPC ......... H04L 47/10; H04L 43/50; H04L 41/12; H04L 45/02; H04L 45/48; H04L 12/462

USPC .......................................... 370/252, 254, 256
See application file for complete search history.

(56) References Cited

U.S. PATENT DOCUMENTS

2003/0016624 A1 *   1/2003   Bare ............................. 370/217

OTHER PUBLICATIONS

Perlman, Radia, et al., "RBridges: Base Protocol Specification," Trill Working Group, INTERNET-DRAFT, <draft-ietf-trill-rbridge-protocol-16.txt>, Mar. 3, 2010, 118 pages.

* cited by examiner

*Primary Examiner* — Ronald B Abelson
(74) *Attorney, Agent, or Firm* — Meunier Carlin & Curfman LLC (57) ABSTRACT

Methods and apparatuses for rapid TRILL convergence are disclosed herein. The methods can be implemented in a network including a plurality of RBridges or in a cloud network environment including a plurality of cloud switch domains. An example method for rapid TRILL convergence can include: Executing a spanning tree protocol (STP) for network topology in a network; and executing a Hello protocol for control and forwarding at the RBridge. The Hello protocol can be configured to elect a designated RBridge and assign an appointed forwarder. The method can also include assigning a transient appointed forwarder during a period of time between convergence of the STP and convergence of the Hello protocol. The transient appointed forwarder can be configured to forward frames in the network during the period of time between convergence of the STP and convergence of the Hello protocol.

20 Claims, 7 Drawing Sheets

METHODS AND APPARATUSES FOR RAPID TRILL CONVERGENCE THROUGH INTEGRATION WITH LAYER TWO GATEWAY PORT

BACKGROUND

Transparent Interconnect of Lots of Links (TRILL) is an IETF standard implemented in RBridges. TRILL provides an architecture of Layer 2 control and forwarding that enjoys major benefits such as pair-wise optimal forwarding, loop mitigation, multipathing and provisioning tree. TRILL supports incremental deployment and interoperation with classical Ethernet (CE) through mechanisms such as adjacencies over shared media, designated RBridge (DRB) election and appointed forwarder (AF) assignment. RBridges on a network run a link state protocol such as IS-IS, for example, to broadcast connectivity to other RBridges on the network. Using the link state protocol, the RBridges determine connectivity between the RBridges. For example, the RBridges obtain information needed to calculate pair-wise optimal paths for unicast and/or distribution trees for multicast/broadcast using the link state protocol. However, TRILL has two limitations that affect convergence in CE.

First, spanning tree protocol (STP) convergence and TRILL convergence are sequential. In response to a network topology change, STP is executed to ensure loop-free network topology by electing a root switch (or bridge) and selecting designated and non-designated ports. TRILL depends on an exchange of HELLO frames to elect the DRB and assign the AF. The HELLO frames are treated as normal data in CE and are subject to blocking. Therefore, STP convergence and TRILL convergence are sequential because the HELLO frames are blocked until STP converges. When a network topology change occurs, connectivity is restored only after STP convergence (e.g., root bridge elected and designated and non-designated ports selected) and TRILL convergence (e.g., DRB elected and AF assigned).

Figure 1:
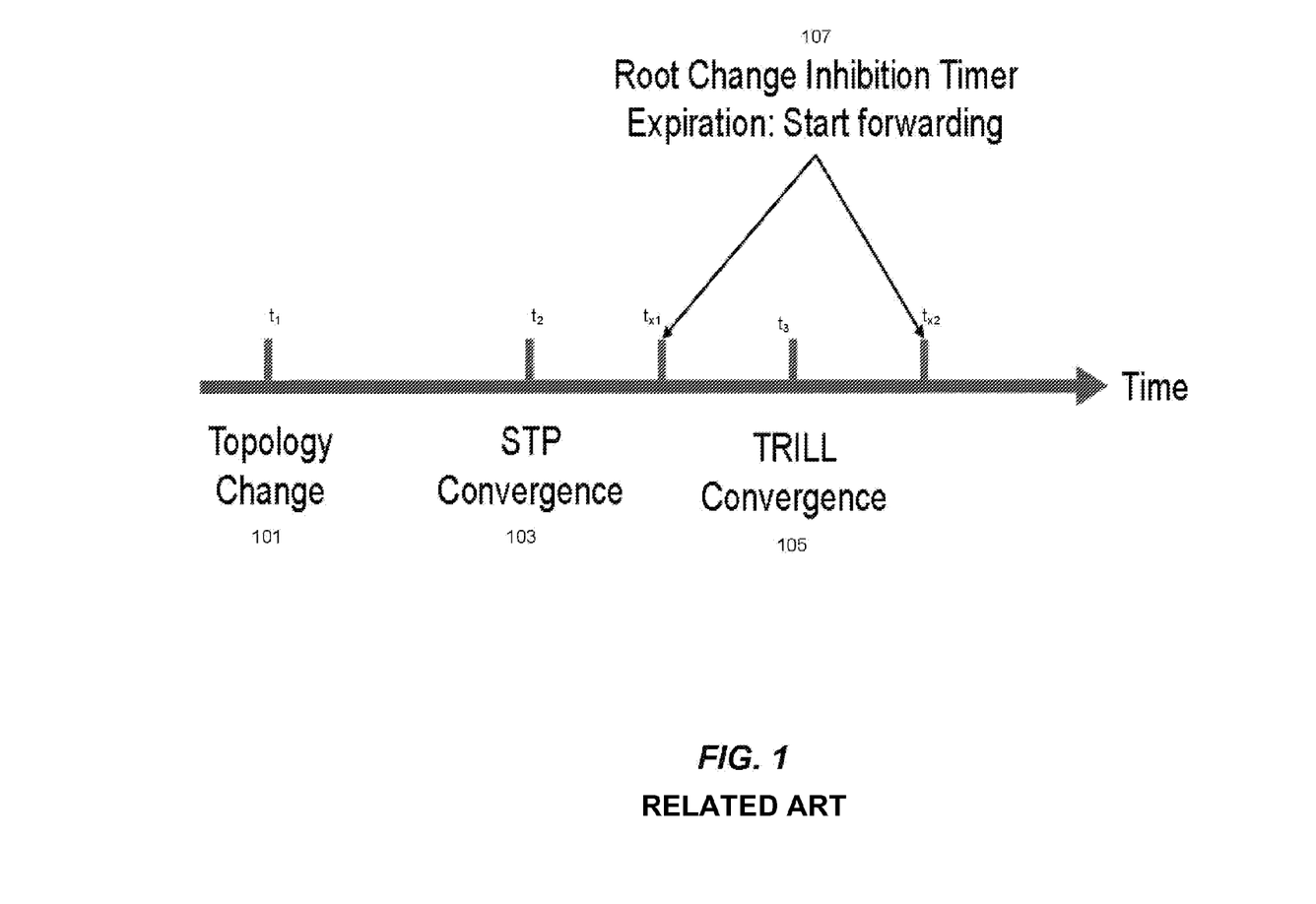
FIG. 1 is a timeline illustrating STP and TRILL convergences following a network topology change.

Additionally, convergence may be un-deterministic. Because STP convergence and TRILL convergence are not lock-step, there may be multiple AFs in one CE in a transient state following a topology change (e.g., after STP convergence but before TRILL convergence). Having multiple AFs in one CE may lead to looping, which is undesirable. To prevent looping, TRILL takes a heuristic approach and prohibits an AF from forwarding until a root change inhibition timer expires. Referring now to FIG. 1, a timeline illustrating STP and TRILL convergences following a network topology change is shown. For example, the network topology change 101 occurs at time $t_1$. Following the network topology change 101, STP is executed and STP convergence 103 occurs at time $t_2$. Then, TRILL is executed and TRILL convergence 105 occurs at time $t_3$. As discussed above, an AF is prohibited from forwarding until a root change inhibition timer 107 expires. For example, the default root change inhibition timer is 30 seconds. However, if the root change inhibition timer 107 is set too short (i.e., time $t_{x1}$), looping may not be prevented because TRILL convergence 105 has not yet occurred. On the other hand, if the root change inhibition timer 107 is set too long (i.e., time $t_{x2}$), looping is prevented but convergence is slow.

SUMMARY

Methods and apparatuses for rapid TRILL convergence are disclosed herein. In some implementations, the methods can be implemented in a network including a plurality of RBridges. In other implementations, the methods can be implemented in a cloud network environment including a plurality of cloud switch domains. For example, a method for rapid TRILL convergence can include: Executing a spanning tree protocol (STP) for network topology in a network; and executing a Hello protocol for control and forwarding at an RBridge. The Hello protocol can be configured to elect a designated RBridge and assign an appointed forwarder. The method can also include assigning a transient appointed forwarder during a period of time between convergence of the STP and convergence of the Hello protocol. The transient appointed forwarder can be configured to forward frames in the network during the period of time between convergence of the STP and convergence of the Hello protocol.

In some implementations, upon convergence of the Hello protocol, the method can include confirming that the transient appointed forwarder is the assigned appointed forwarder or un-assigning the transient appointed forwarder.

Additionally, the method can include assigning a transient appointed forwarder by: Transmitting a bridge protocol data unit (BPDU) from the RBridge; and receiving one or more BPDUs from one or more of the plurality of RBridges at the RBridge. Each BPDU can include a pseudo root bridge identifier, and the transient appointed forwarder can be an RBridge having a highest root bridge priority based on the one or more BPDUs. The pseudo root bridge identifier of each BPDU can optionally be constructed using a highest root bridge priority (i.e., 0) and a MAC address of an RBridge. In some implementations, the method can also include transmitting a Hello protocol message including an integration Time-Length-Value (TLV) indicating an appointed forwarder status.

Optionally, the method can include: detecting a change in network topology; and in response to detecting the change in network topology, executing the STP that converges with a logical port of the RBridge transitioning from a root blocking state to a designated forwarding state. Then, during the period of time between convergence of the STP and convergence of the Hello protocol, the method can include assigning the RBridge as the transient appointed forwarder; setting a transient appointed forwarder timer; transmitting a Hello protocol message indicating that the RBridge is the transient appointed forwarder; and forwarding the frames within the network with the RBridge during the period of time. If the Hello protocol converges before expiration of the transient appointed forwarder timer, the method can include confirming the transient appointed forwarder is the assigned appointed forwarder or un-assigning the transient appointed forwarder. On the other hand, if the Hello protocol fails to converge before expiration of the appointed forwarder timer, the method can include un-assigning the appointed forwarder.

In addition, the method can include: Detecting a change in network topology; and in response to detecting the change in network topology, executing the STP that converges with a logical port of the RBridge transitioning from a designated forwarding state to a root blocking state or converges with a logical port of the RBridge remaining in a root blocking state and a change in spanning tree root bridge. If the RBridge is an appointed forwarder, the method can include un-assigning the RBridge as the appointed forwarder; and upon un-assigning the RBridge, transmitting a Hello protocol message indicating that the RBridge is not the appointed forwarder.

Optionally, as discussed above, each RBridge can include a plurality of RBridges operably connected to form a cloud switch domain.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms. While implementations will be described for rapid TRILL convergence in a cloud switching environment, it will become evident to those skilled in the art that the implementations are not limited thereto, but are applicable for rapid TRILL convergence in other network environments.

Figure 2A:
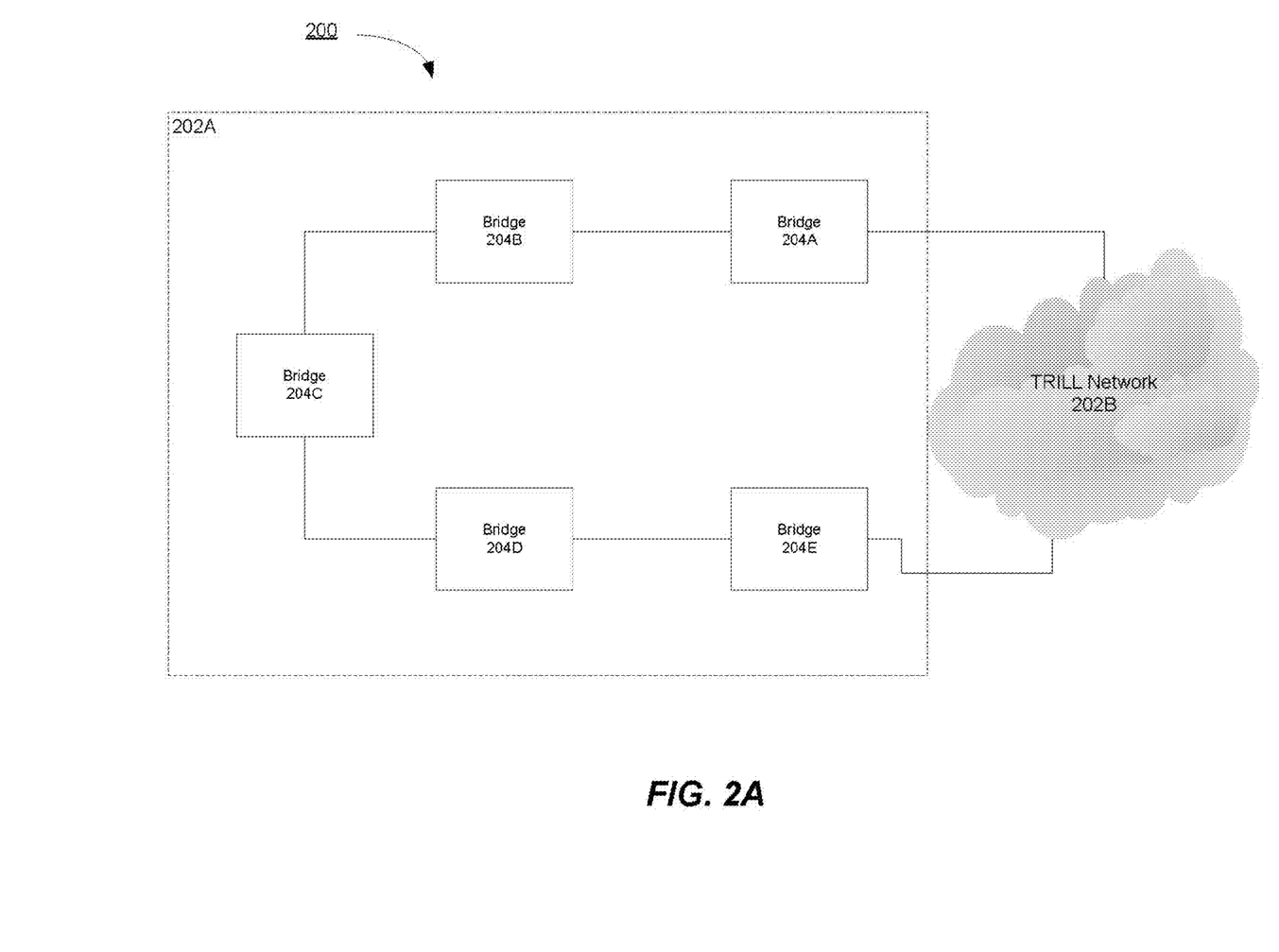
FIGS. 2A-2B are block diagrams illustrating example environments for implementing rapid TRILL convergence.

Referring now to FIG. 2A, a block diagram of an environment for implementing rapid TRILL convergence is shown. The environment includes a computer network 200. The computer network 200 typically includes a plurality of interconnected nodes (e.g., client devices, server devices, storage devices, switches, etc.). The computer network 200 can include an Ethernet local area network (LAN). The network nodes can be coupled to the computer network 200 through one or more communication links. This disclosure contemplates that the communication links are any suitable communication link. For example, a communication link may be implemented by any medium that facilitates data exchange between the network nodes including, but not limited to, wired, wireless and optical links. Example communication links include, but are not limited to, an Ethernet LAN.

A common type of computer network is a LAN, which is typically a privately owned network deployed within a single building or campus. One or more LANs can be connected by intermediate devices to allow the one or more LANs to exchange information. For example, a bridge (or switch) is an example intermediate devices configured to provide bridging (or switching) between one or more LANs. As shown in FIG. 2A, the computer network 200 includes a bridged network 202A having a plurality of interconnected bridges 204A, 204B, 204C, 204D, 204E and a TRILL network 202B. The bridges 204A, 204B, 204C, 204D, 204E shown in FIG. 2A can be Ethernet bridges.

The bridges 204A, 204B, 204C, 204D, 204E can be computing devices including a plurality of ports coupled to the LANs (or links). End stations (e.g., client devices, server devices, storage devices, etc.) can be connected through the LANs to the bridges 204A, 204B, 204C, 204D, 204E through access ports. The bridges 204A, 204B, 204C, 204D, 204E can be connected through the LANs to one or more of the other bridges 204A, 204B, 204C, 204D, 204E through trunk ports. The bridges 204A, 204B, 204C, 204D, 204E are configured to perform the bridging function by receiving frames from a source device (e.g., a client device) at a source port and transferring the frames to at least one destination port for forwarding to a destination device (e.g., a server device). The bridges 204A, 204B, 204C, 204D, 204E typically operate at Layer 2 in the communication protocol stack. Accordingly, the bridges 204A, 204B, 204C, 204D, 204E forward the frames based on source and destination addresses such as MAC addresses, for example. The source address can be the MAC address of a sourcing bridge, and the destination device can be the MAC address of a destination bridge. Therefore, when one of the bridges 204A, 204B, 204C, 204D, 204E receives a frame from a source device at a source port, it inspects the frame and transfers the frame to at least one destination port associated with the destination MAC address of the frame. It should be understood that FIG. 2A is only one example configuration for a computer network and is not meant to limit implementations discussed herein.

Figure 2B:
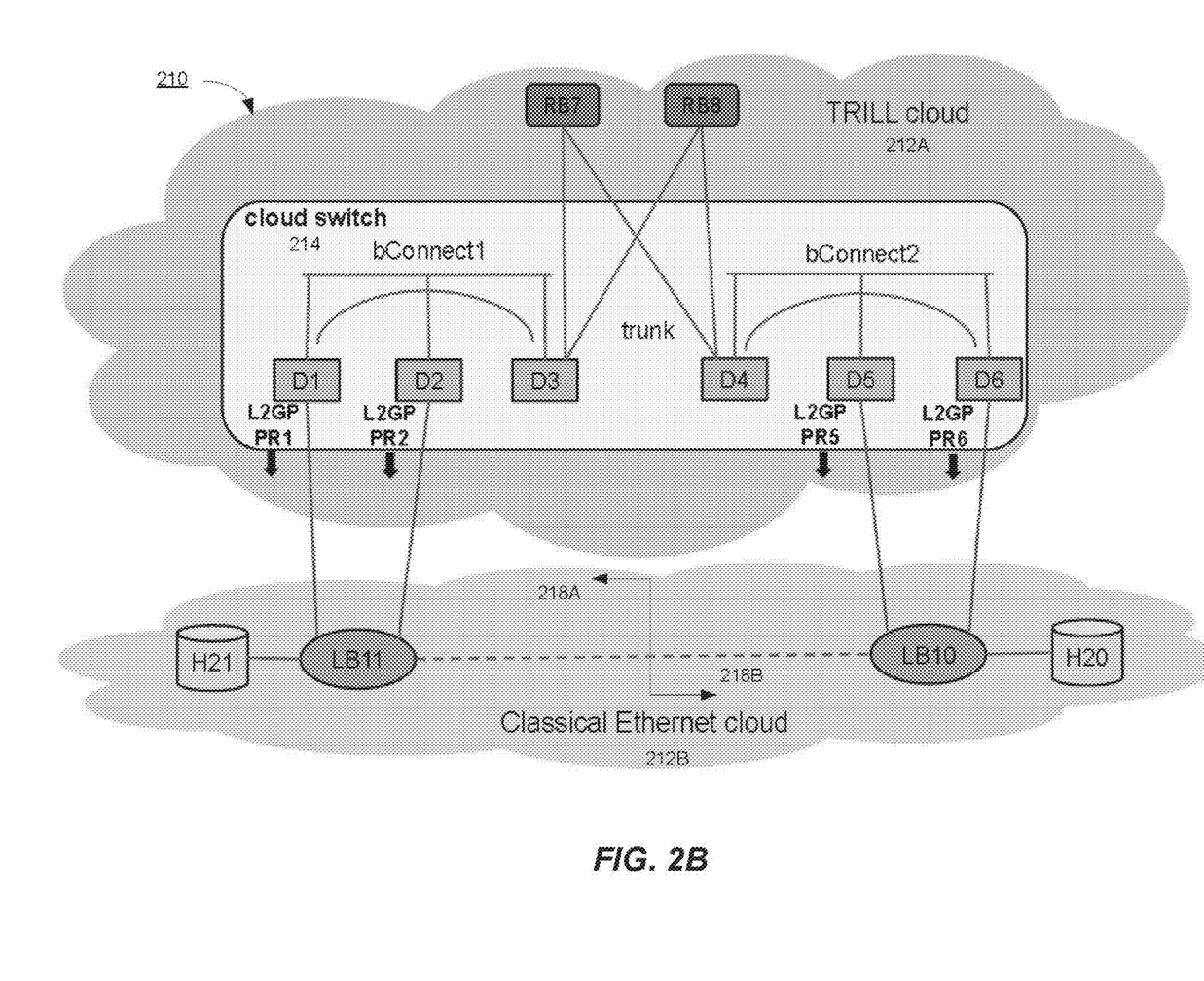

Referring now to FIG. 2B, another block diagram of an environment for implementing rapid TRILL convergence is shown. In particular, FIG. 2B is a block diagram illustrating a cloud environment for implementing rapid TRILL convergence. It should be understood that it is possible to provide access to a shared pool of computing resources (e.g., networks, servers, storage, applications, services, etc.) that can be provisioned and released with minimal interaction in a cloud computing environment. In FIG. 2B, a computer network 210 includes a TRILL cloud 212A and a CE cloud 212B. The CE cloud 212B includes switches LB10 and LB11, each of which is connected to host H20 or H21, respectively. The TRILL cloud 212A includes a cloud switch 214. Cloud switching is a paradigm of networking that uses a fabric interconnect to attach multiple leaf switches (or bridges) to form virtual bridges or domains. In FIG. 2B, the cloud switch 214 includes domains D1, D2, D3, D4, D5, D6, each of which can include a plurality of switches. The cloud switch 214 also includes bConnect1 and bConnect2, which are internal logical media links used to connect a plurality of domains. For example, bConnect1 connects domains D1, D2, D3, while bConnect2 connects domains D4, D5, D6. The bConnects allow domains attached to the same bConnect to switch traffic through the fabric. In FIG. 2B, bConnect1 and bConnect2 are interconnected through spine RBridges RB7 and RB8. As such, the cloud switch 214 can be configured to support TRILL to support Layer 2 multipathing in a data center, for example. The cloud switch 214 can also be configured to support Layer 2 Gateway Port (L2GP) to present the cloud switch 214 as a root bridge because it has a large switching capacity. It should be understood that FIG. 2B is only one example configuration for a computer network and is not meant to limit implementations discussed herein.

As discussed above, TRILL has two limitations that affect convergence in CE-STP and TRILL convergences are sequential and convergence is un-deterministic (due to the root change inhibition timer). In response to a change in network topology, STP is executed to ensure loop-free network topology. In particular, a root bridge is elected and designated and non-designated ports are selected. Then, following STP convergence, the RBridges in a computer network (e.g., TRILL network 202B, computer network 210, for example) execute a link state protocol such as IS-IS, for example, to broadcast connectivity to other RBridges on the computer network (or link). For example, in accordance with the link state protocol, the RBridges exchange HELLO frames to elect the DRB and assign the AF. The RBridges, therefore, perform a Hello protocol to elect the DRB and assign the AF. The DRB is the RBridge that handles traffic ingressing to/egressing from the link. The DRB encapsulates frames in a local link header and a TRILL header, for example. The link header identifies the local source RBridge and the local destination RBridge (for unicast) or multiple RBridges (for multicast/broadcast). The TRILL header identifies the ingress RBridge and the egress RBridge (for unicast) or the distribution tree root bridge (for multicast/broadcast). Additionally, one or more AFs can be assigned. The AFs can be assigned to handle frames for VLANs within the link. There can only be one AF for each VLAN within the link. In some implementations, the DRB can be the AF for one or more of the VLANs within the link. In other implementations, the AF can be an RBridge different than the DRB. However, because the TRILL HELLO frames are treated as normal data in CE and are subject to blocking until STP converges, the Hello protocol is not executed until after STP converges. Additionally, to prevent looping caused by having multiple AFs, an AF is prohibited from forwarding until a root change inhibition timer expires. The default root change inhibition timer can be 30 seconds, for example.

To facilitate rapid TRILL convergence following a change in network topology, a transient AF can be assigned during a period of time between convergence of STP and convergence of the Hello protocol. As shown in FIG. 1, this time period (e.g., a transient time period) is between $t_2$ and $t_3$. In this way, convergence (e.g., STP and TRILL convergence) can be achieved as fast as STP convergence. Following convergence of the Hello protocol (e.g., DRB elected and AF assigned), it is possible to confirm that the assigned AF is the transient AF or to un-assign the transient AF/assign the AF according to the Hello protocol. In other words, it is possible to confirm that the same RBridge is both the transient AF and the AF assigned according to the Hello protocol or un-assign the RBridge that acts as the transient AF/assign the RBridge according to the Hello protocol.

Figure 3A:
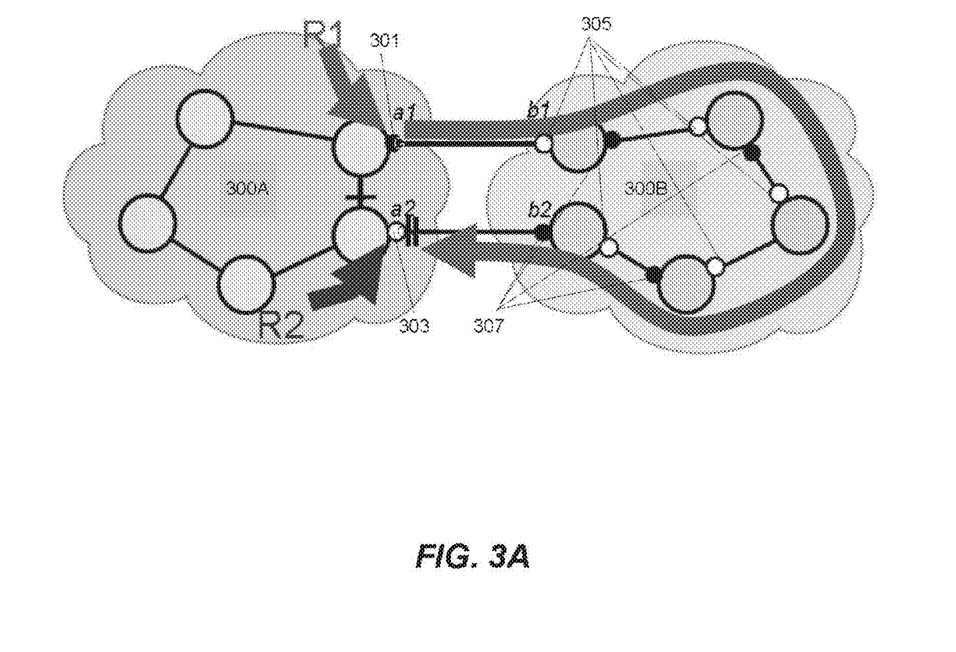
FIG. 3A is a block diagram illustrating an environment for implementing Layer 2 Gateway Port (L2GP)

In an example implementation, the transient AF can be assigned using L2GP (as specified in IEEE 802.1ah). L2GP provides a mechanism for selecting gateways between customer and provider networks. An environment for implementing L2GP is shown in FIG. 3A, for example. In FIG. 3A, a provider network 300A is connected to a customer network 300B through gateway ports. The following ports are illustrated in FIG. 3A: gateway forwarding 301, gateway discarding 303, root port (forwarding) 305 and designated port (forwarding) 307. The gateway ports can provide redundancy with one unique gateway port being selected as the gateway port. For example, the gateway ports 301 and 303 are configured with pseudo root bridge identifiers R1 and R2, respectively. In FIG. 3A, the pseudo root bridge identifier of the gateway 301 (i.e., R1) is better than the pseudo root bridge identifier of the gateway 303 (i.e., R2) (and any bridge in the customer network 300B). The gateway ports 301 and 303 send Bridge Protocol Data Units (BPDUs) including the pseudo root bridge identifiers R1 and R2 of the gateway ports 301 and 303, respectively. The gateway port 301 is a root forwarding port because it receives its best BPDU (i.e., with pseudo root bridge identifier R1 of the gateway 301). One advantage of L2GP is that the gateway selection can be made as fast as STP convergence. However, there are obstacles to implementing L2GP in RBridges. First, L2GP was designed for CE and depends on STP state to control traffic, while TRILL depends on AF logic. Additionally, L2GP needs to be implemented and configured on all gateways. If L2GP is not implemented or is misconfigured, the BPDUs need to be tunneled through the backbone and processed at the gateway port to avoid a loop. However, BPDU tunneling is not allowed in RBridges. Further, L2GP needs to configure pseudo root bridge identifiers that are better than any bridge identifier in the customer network (or all gateway ports will be in a root blocking state). RBridges, however, are supposed to function correctly without any provisioning or restriction.

Figure 3B:
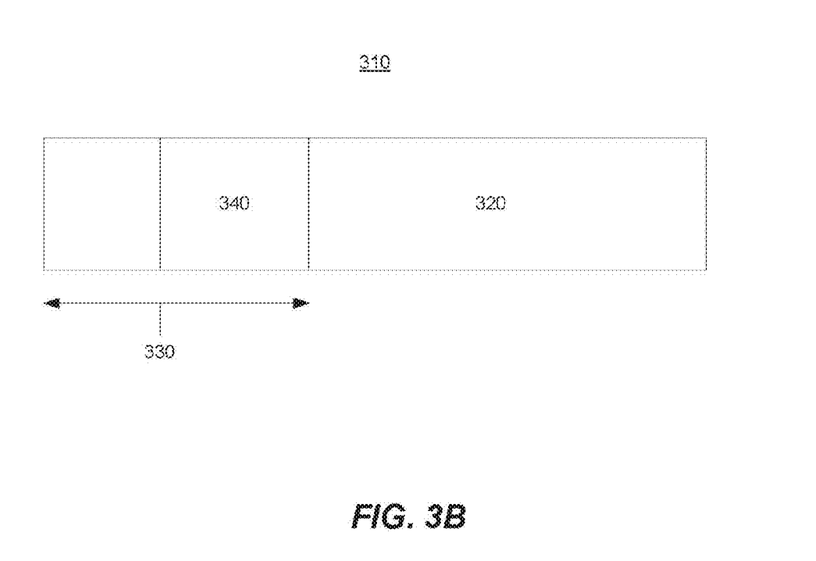
FIG. 3B is a block diagram of an example link layer protocol frame.

In an example implementation, an L2GP integration module can be added to one or more of the RBridges in a computer network. The L2GP integration module (discussed below with regard to FIG. 4) facilitates collaboration between convergence of STP and convergence of the Hello protocol. In particular, the L2GP integration module is configured to select a transient AF during a period of time between convergence of STP and convergence of the Hello protocol. The L2GP integration module generates BPDUs including a pseudo root bridge identifier. The pseudo root bridge identifier can include a bridge priority such as one of the highest bridge priorities (e.g., 0), for example. The pseudo root bridge identifier can optionally include an RBridge address such as a MAC address, for example. In other words, the pseudo root bridge identifier can be constructed from a bridge priority and a MAC address of an RBridge. In some implementations, Time-Length-Value (TLV) data can be added to the link state protocol HELLO to allow the RBridge with L2GP integration to inform the other RBridges of its capabilities and states. For example, an L2GP Integration TLV can be added to the Hello protocol message. The L2GP Integration TLV can include an RBridge's capability to support L2GP integration, a pseudo root bridge identifier (e.g., bridge priority and MAC address), transient AF status, or any other information. Referring to FIG. 3B, a block diagram of an example Hello protocol frame 310 is shown. The Hello protocol frame 310 includes an encapsulation field 330 and a payload 320. The encapsulation field 330 can optionally include the link protocol header and TRILL header discussed above. The encapsulation field 330 can also include the L2GP Integration TLV 340.

Rapid convergence can be achieved by TRILL and L2GP integration. In response to a change in network topology, a logical port of one of the RBridges (or virtual bridges/domains) in a computer network (e.g., TRILL network 202B, computer network 210, for example) may transition states from root blocking to designated forwarding. This can be the result of STP convergence, for example. In this case, the L2GP module notifies internal TRILL logic (e.g., AF and inhibition logic discussed below) of a selected gateway. The selected gateway is the RBridge having the best pseudo root bridge identifier (e.g., associated with the highest priority). Thus, the selected RBridge is one of the RBridges having an L2GP integration module. The selected RBridge can be assigned as a transient AF. Upon selection, the RBridge assigned as the transient AF can transmit the Hello protocol message indicating its status as the transient AF. The transient AF can also be allowed to forward frames during a time period between convergence of STP and convergence of the Hello protocol. Although a root bridge change is detected, the internal TRILL logic does not start a root change inhibition timer and instead allows the transient AF to forward frames immediately. Thus, the transient AF is not prevented from encapsulating and forwarding and/or decapsulating and outputting frames during the transient period. Optionally, the TRILL logic can start a transient AF timer. The transient AF timer can optionally be configured to be equal to the default root change inhibition timer (e.g., 30 seconds, for example). It should be understood that the transient AF timer is not limited to being equal to the default root change inhibition timer and can have other values. Upon convergence of the Hello protocol, the RBridge assigned as the transient AF receives a Hello protocol message from the elected DRB for AF assignment and the transient AF timer is stopped. If the transient AF timer expires before a Hello protocol message from the elected DRB for AF assignment is received, the RBridge assigned as the transient AF ceases acting as an AF at expiration (and notifies the other RBridges of its change in AF status).

In response to a change in network topology, a logical port of one of the RBridges in the computer network may transition states from designated forwarding to root blocking. Alternatively, a logical port of one of the RBridges in the computer network may remain in a root blocking state but the root bridge changes. This can be the result of STP convergence, for example. In this case, the L2GP module notifies the TRILL logic that the gateway is de-selected. If the RBridge is acting as the AF, the RBridge ceases acting as the AF (and notifies the other RBridges of its change in AF status). Upon convergence of the Hello protocol, if the RBridge is assigned as the AF by the DRB, the RBridge does not begin forwarding frames until a root RBridge stops indicating itself as the transient AF.

Referring now to FIG. 2B, example operations for rapid TRILL convergence are discussed. For example, assume initially that the link between switch LB10 and switch LB11 is operating and domain D1 is acting as the AF. If the link between switch LB10 and switch LB11 is shutdown as shown by the dotted line in the CE cloud 212B, there is no impact on the left-side portion 218A of the CE cloud 212B because the root bridge remains unchanged (e.g., domain D1 remains root bridge). However, on the right-side portion 218B of the CE cloud 212B, there is a root bridge change (e.g., to domain D5). Because a logical port on domain D5 changes states from root blocking to designated forwarding, domain D5 is assigned as the transient AF. Domain D5 can be assigned as the transient AF according to L2GP. As shown in FIG. 2B, PR1, PR2, PR5, PR6 are pseudo root bridge identifiers of the BPDUs transmitted from domains D1, D2, D5, D6, respectively. Accordingly, when assigned as the transient AF, domain D5 is configured to forward frames during the time period between convergence of STP and convergence of the Hello protocol. Upon convergence of the Hello protocol, the DRB can either assign domain D5 as the permanent AF or assign another domain such as domain D6, for example, as the permanent AF. If a new domain is assigned as the permanent AF, the new, permanent AF (e.g., domain D6) is configured to not begin forwarding until the transient AF (e.g., domain D5) ceases acting as the transient AF and notifies the other domains that it is no longer acting as an AF through the L2GP Integration TLV. Now the link between switch LB10 and switch LB11 can be restored. When the link between switch LB10 and switch LB11 is restored, domain D1 does not detect a root bridge change, but domain D6 detects a root bridge change (e.g., to domain D1). The change in root bridge can be detected based on a change in root bridge identifier, for example. Thus, domain D6 ceases acting as the AF. As discussed above, domain D6 ceases acting as the AF even if its logical port remains in a root blocking state. It should be understood that operations for rapid TRILL convergence are not limited to network environments including cloud switches and can also be implemented in other computer networks such as the computer network shown in FIG. 2A.

Optionally, the RBridge having the best pseudo root bridge identifier can be appointed as the permanent AF. For example, assume initially that the link between switch LB10 and switch LB11 is operating and D6 is acting as the AF. When the link between switch LB10 and switch LB11 is shutdown, the left-hand portion 218A of the CE cloud 212B no longer has an AF. However, no root bridge change is detected because domain D1 remains root bridge. Thus, a transient AF will not be appointed, and instead, traffic on the left-side portion 218A of the CE cloud 212B is disrupted until convergence of the Hello protocol (e.g., DRB elected and AF assigned). Therefore, it is desirable that if the elected DRB discovers an RBridge advertising a pseudo root bridge identifier that matches the new root bridge identifier and is acting as a transient AF, the DRB can assign this RBridge as the permanent AF.

RBridges with L2GP integration are capable of overcoming obstacles to implementing L2GP in RBridges. First, RBridges with L2GP integration will function despite the possibility of pseudo root restriction. For example, in the case that all pseudo root bridge identifiers are inferior (e.g., switch LB11's priority is the highest), the DRB eventually appoints an RBridge as AF upon convergence of the Hello protocol even though no transient AF is appointed by L2GP due to pseudo root restriction. Additionally, as long as standard RBridges (without L2GP integration) have root change inhibition timers properly configured (e.g., set to the default of 30 seconds), RBridges with L2GP integration can co-exist with the standard RBridges. For example, in response to a change in network topology, an RBridge with L2GP integration can only become a transient AF when it is the new root bridge. If the previous AF is a standard RBridge, it will detect the root bridge change, start the root bridge inhibition timer and cease forwarding during the transient period. This guarantees that there will only be one RBridge forwarding until convergence of the Hello protocol.

Figure 4:
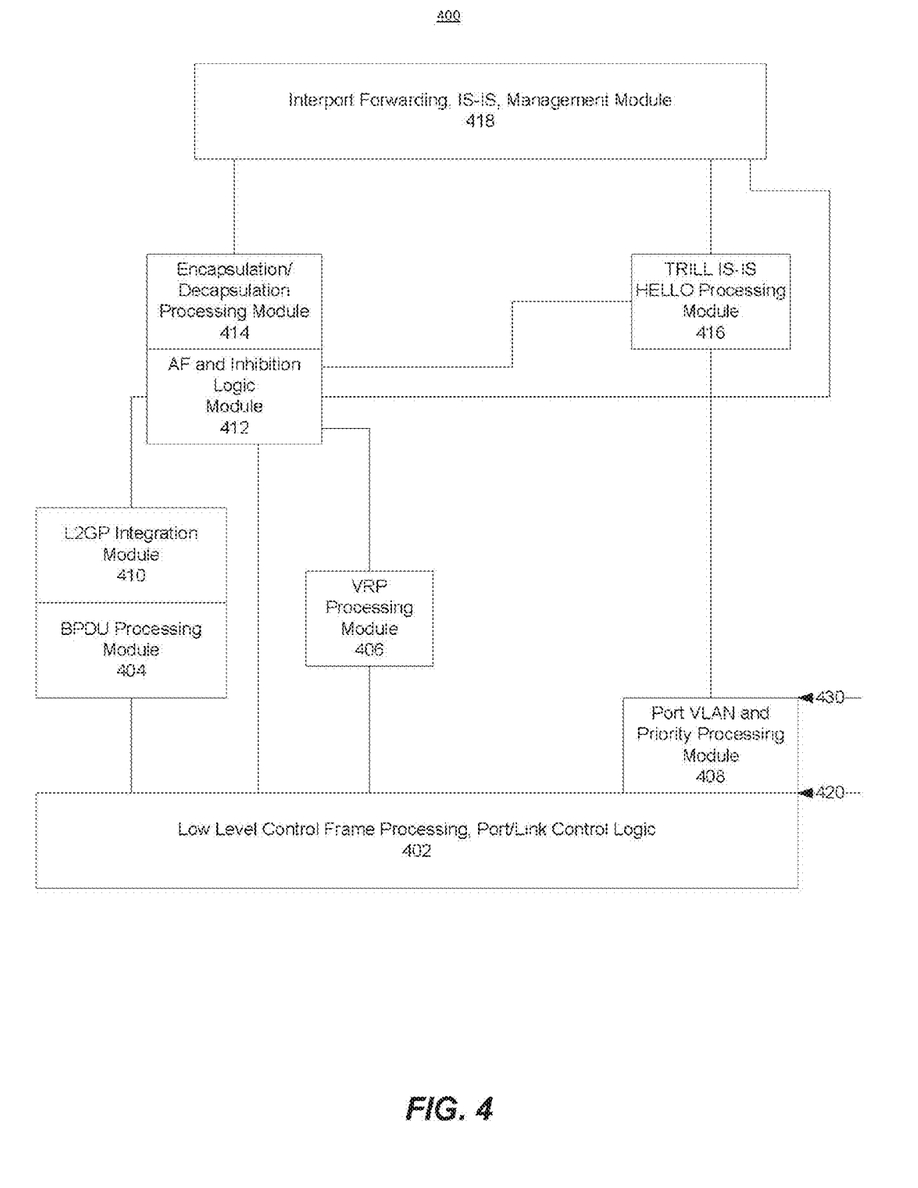
FIG. 4 is a block diagram of an example RBridge port model.

Referring to FIG. 4, a block diagram of an example RBridge port model is shown. The upper layer and lower layer of the RBridge port model 400 are the interport forwarding, IS-IS, management module 418 and the low level control frame processing, port/link control logic module 402, respectively. The low level control frame processing, port/link control logic module 402 can be configured to handle low level control frames. This module can optionally include link specific protocols defined in IEEE 802.1 and/or IEEE 802.3 such as PAUSE, link layer discovery, link aggregation, MAC security, port-based access control, etc. The upper interface to the low level control frame processing, port/link control logic module 402 is the Internal Sublayer Service (ISS) 420. The RBridge port model 400 can also include a BPDU processing module 404, VRP processing module 406 and a port VLAN and priority processing module 408. The BPDU processing module 404 is configured to process high-level control frames not tagged for VLAN, and the VRP processing module 406 is configured to process VLAN registration frames. For example, the BPDU processing module 404 is configured to listen to spanning tree configuration BPDUs, which facilitates detection of a change in the root bridge. The port VLAN and priority processing module 408 is configured to process frames other than Layer 2 control frames such as TRILL and native frames, for example. The upper interface to the port VLAN and priority processing module 408 is the Extended Internal Sublayer Service (ISS) 430.

The RBridge port model 400 can also include an L2GP integration module 410, an AF and inhibition logic module 412, an encapsulation/decapsulation processing module 414 and a TRILL IS-IS HELLO processing module 416. The encapsulation/decapsulation module 414 is configured to encapsulate and forward incoming native frames and decapsulate and output native frames. The AF and inhibition logic module 412 is configured to receive data from the BPDU processing module 404 and the TRILL IS-IS HELLO processing module 416. The AF and inhibition logic module 412 is configured to prevent the RBridge from forwarding until expiration of a root change inhibition timer. For example, in response to a change in network topology, a change in root bridge may occur. If a change in root bridge is detected, the RBridge is prevented from forwarding until expiration of the root change inhibition timer to allow convergence of the link state protocol. However, in an RBridge with L2GP integration, the L2GP integration module 410 is a layer below the AF and inhibition logic module 412 that facilitates collaboration between convergences of STP and the link state protocol. Specifically, as discussed above, the L2GP integration module 410 is configured to appoint a transient AF during a time period between convergence of STP and convergence of the Hello protocol. Thus, instead of inhibiting the RBridge from forwarding during the transient time period using the root change inhibition timer, the L2GP integration module 410 and the AF and inhibition logic module 412 coordinate to appoint the transient AF and allow the transient AF to forward during the transient period.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 5:
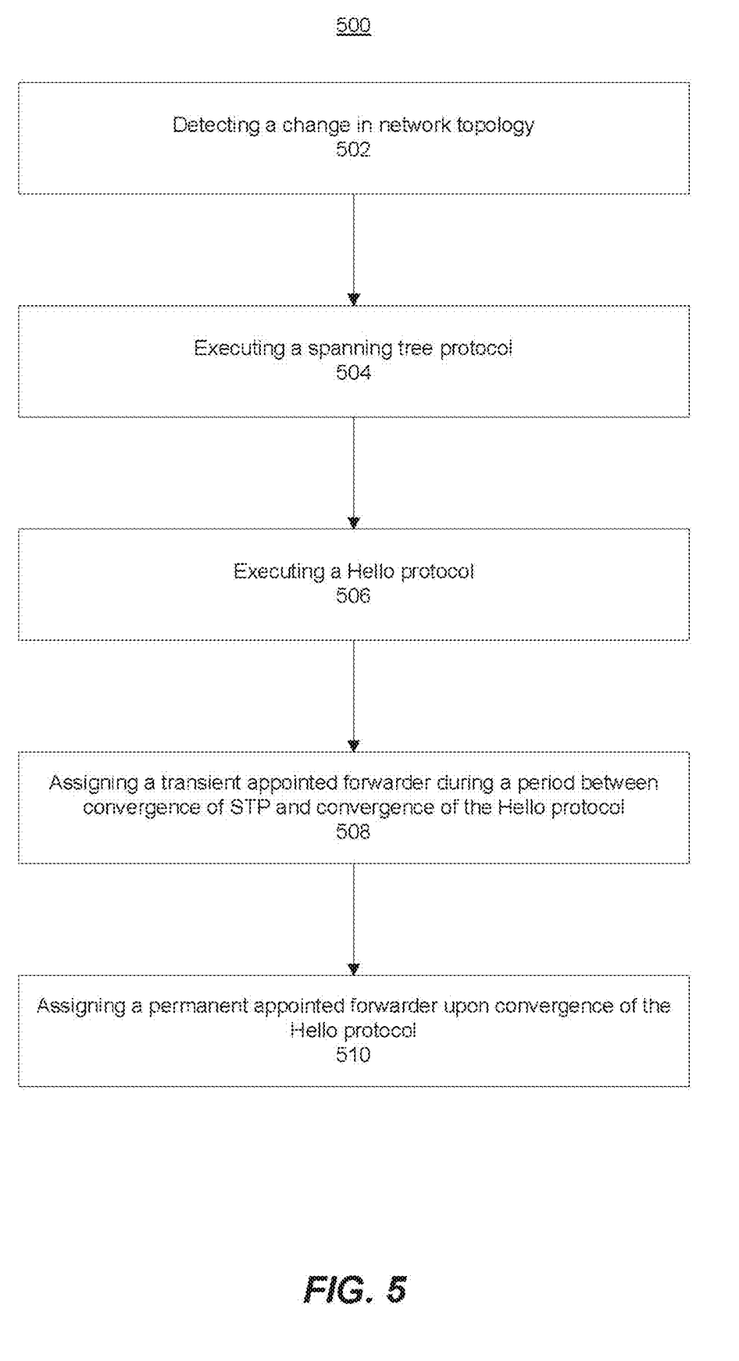
FIG. 5 is a flow diagram illustrating example operations for rapid TRILL convergence.

Referring now to FIG. 5, a flow diagram illustrating example operations 500 for rapid TRILL convergence is shown. At 502, a change in network topology is detected. In response to the change in network topology, a spanning tree protocol (STP) is executed in the network at 504. STP results in election of a root bridge and selection of designated and non-designated ports. Thereafter, a Hello protocol is executed at 506. During a time period between convergence of STP and convergence of the Hello protocol, a transient appointed forwarder (AF) is assigned at 508. As discussed above, the RBridge can include an L2GP integration module that is configured to select an RBridge as the transient AF. The transient AF is allowed to forward frames during the period of time between convergence of STP and convergence of the Hello protocol. Upon convergence of the Hello protocol, a permanent AF is assigned at 510. The permanent AF can be the RBridge assigned as the transient AF (in which case the assignment is confirmed) or a different RBridge (in which case the transient AF is un-assigned).

Figure 6:
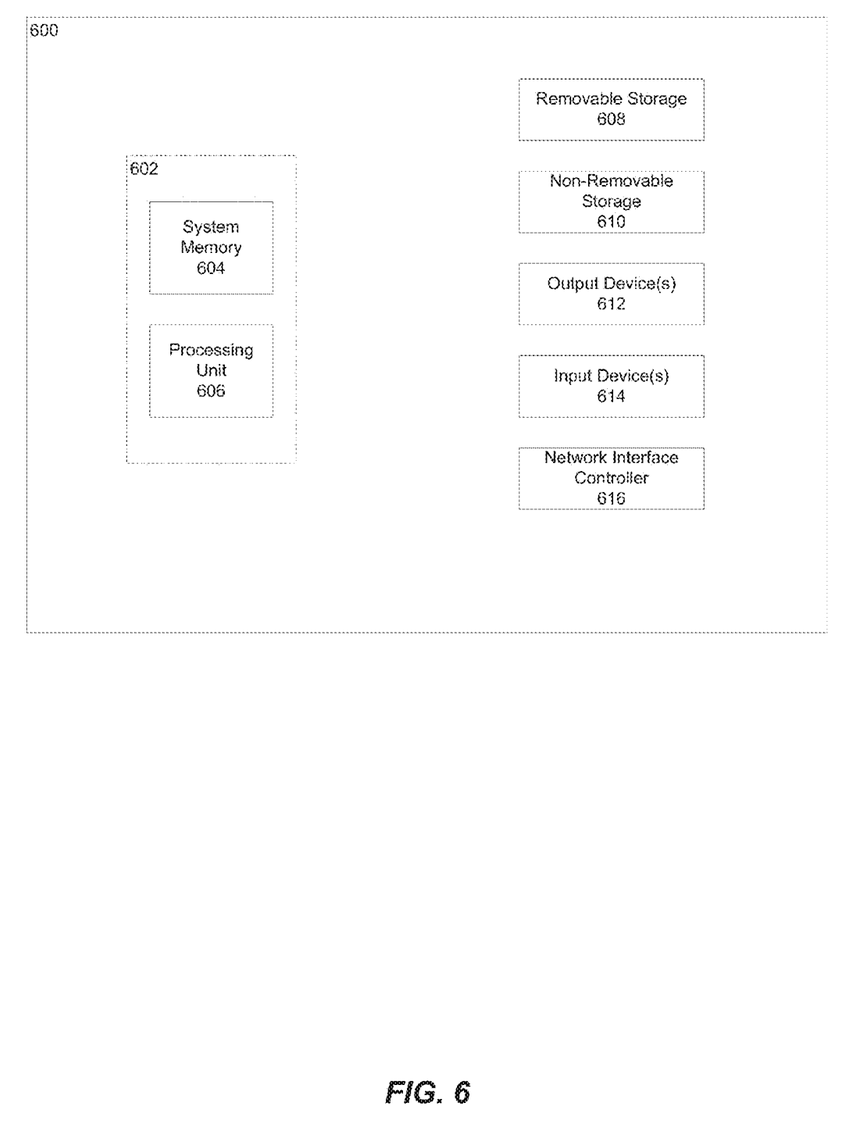
FIG. 6 is an example computing device.

When the logical operations described herein are implemented in software, the process may execute on any type of computing architecture or platform. For example, referring to FIG. 6, an example computing device upon which embodiments of the invention may be implemented is illustrated. In particular, each of the RBridges discussed above may be a computing device, such as computing device 600 shown in FIG. 6. The computing device 600 may include a bus or other communication mechanism for communicating information among various components of the computing device 600. In its most basic configuration, computing device 600 typically includes at least one processing unit 606 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 602. The processing unit 606 may be a standard programmable processor that performs arithmetic and logic operations necessary for operation of the computing device 600.

Computing device 600 may have additional features/functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Computer-readable media refers to any media that is capable of providing data that causes the computing device 600 (i.e., a machine) to operate in a particular fashion. Various computer-readable media may be utilized to provide instructions to the processing unit 606 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solidstate device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

Computing device 600 typically includes a variety of computer-readable media. Computer-readable media can be any available media that can be accessed by device 600 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for rapid Transparent Interconnect of Lots of Links (TRILL) convergence in a network having a plurality of RBridges, comprising:
   executing a spanning tree protocol (STP) for network topology in the network;
   executing a Hello protocol for control and forwarding at an RBridge, the Hello protocol being configured to elect a designated RBridge and assign an appointed forwarder; and
   during a period of time between convergence of the STP and convergence of the Hello protocol, assigning a transient appointed forwarder, the transient appointed forwarder being configured to forward frames within the network during the period of time.

2. The method of claim 1, further comprising, upon convergence of the Hello protocol, confirming that the transient appointed forwarder is the assigned appointed forwarder or un-assigning the transient appointed forwarder.

3. The method of claim 1, wherein assigning a transient appointed forwarder further comprises:
   transmitting a bridge protocol data unit (BPDU) from the RBridge; and
   receiving one or more BPDUs from one or more of the plurality of RBridges at the RBridge, wherein each BPDU comprises a pseudo root bridge identifier, and the transient appointed forwarder is an RBridge having a highest root bridge priority based on the one or more BPDUs.

4. The method of claim 3, wherein the pseudo root bridge identifier of each BPDU comprises a root bridge priority of 0 and a MAC address of an RBridge.

5. The method of claim 4, further comprising transmitting a Hello protocol message including an integration Type-Length-Value (TLV) indicating an appointed forwarder status.

6. The method of claim 5, further comprising:
   detecting a change in network topology;
   in response to detecting the change in network topology, executing the STP that converges with a logical port of the RBridge transitioning from a root blocking state to a designated forwarding state;
   during the period of time between convergence of the STP and convergence of the Hello protocol, assigning the RBridge as the appointed forwarder;
   setting a transient appointed forwarder timer;
   transmitting a Hello protocol message indicating that the RBridge is the appointed forwarder;
   forwarding the frames within the network with the RBridge during the period of time, wherein:
   if the Hello protocol converges before expiration of the transient appointed forwarder timer, confirming the transient appointed forwarder is the assigned appointed forwarder or un-assigning the transient appointed forwarder, and
   if the Hello protocol fails to converge before expiration of the appointed forwarder timer, un-assigning the appointed forwarder.

7. The method of claim 5, further comprising:
   detecting a change in network topology;
   in response to detecting the change in network topology, executing the STP that converges with a logical port of the RBridge transitioning from a designated forwarding state to a root blocking state;
   if the RBridge is an appointed forwarder, un-assigning the RBridge as the appointed forwarder; and upon un-assigning the RBridge, transmitting a Hello protocol message indicating that the RBridge is not the appointed forwarder.

8. The method of claim 5, further comprising:
   detecting a change in network topology;
   in response to detecting the change in network topology, executing the STP that converges with a logical port of the RBridge remaining in a root blocking state and a change in spanning tree root bridge;
   if the RBridge is an appointed forwarder, un-assigning the RBridge as the appointed forwarder; and
   upon un-assigning the RBridge, transmitting a Hello protocol message indicating that the RBridge is not the appointed forwarder.

9. The method of claim 1, wherein each RBridge comprises a plurality of RBridges operably connected to form a cloud switch domain.

10. A non-transient computer-readable medium for rapid Transparent Interconnect of Lots of Links (TRILL) convergence in a network having a plurality of RBridges having computer-executable instructions stored thereon that, when executed by an RBridge, cause the RBridge to:
   execute a spanning tree protocol (STP) for network topology;
   execute a Hello protocol for control and forwarding, the Hello protocol being configured to elect a designated RBridge and assign an appointed forwarder; and
   during a period of time between convergence of the STP and convergence of the Hello protocol, assign a transient appointed forwarder, the transient appointed forwarder being configured to forward frames in the network during the period of time.

11. The non-transient computer-readable medium of claim 10, having further computer-executable instructions stored thereon that, when executed by the RBridge, cause the RBridge to, upon convergence of the Hello protocol, confirm that the transient appointed forwarder is the assigned appointed forwarder or un-assign the transient appointed forwarder.

12. The non-transient computer-readable medium of claim 10, having further computer-executable instructions stored thereon for assigning a transient appointed forwarder that, when executed by the RBridge, cause the RBridge to:
   transmit a bridge protocol data unit (BPDU); and
   receive one or more BPDUs from one or more of the plurality of RBridges, wherein each BPDU comprises a pseudo root bridge identifier, and the transient appointed forwarder is an RBridge having a highest root bridge priority based on the one or more BPDUs.

13. The non-transient computer-readable medium of claim 12, having further computer-executable instructions stored thereon that, when executed by the RBridge, cause the RBridge to transmit a Hello message including an integration Type-Length-Value (TLV) indicating an appointed forwarder status.

14. The non-transient computer-readable medium of claim 13, having further computer-executable instructions stored thereon that, when executed by the RBridge, cause the RBridge to:
   detect a change in network topology;
   in response to detecting the change in network topology, execute the STP that converges with a logical port of the RBridge transitioning from a root blocking state to a designated forwarding state;
   during the period of time between convergence of the STP and convergence of the Hello protocol, assign the RBridge as the appointed forwarder;
   set a transient appointed forwarder timer;
   transmit a Hello protocol message indicating that the RBridge is the appointed forwarder;
   forward the frames within the network during the period of time, wherein:
      if the Hello protocol converges before expiration of the transient appointed forwarder timer, confirm that the transient appointed forwarder is the assigned appointed forwarder or un-assign the transient appointed forwarder, and
      if the Hello protocol fails to converge before expiration of the appointed forwarder timer, un-assign the appointed forwarder.

15. The non-transient computer-readable medium of claim 13, having further computer-executable instructions stored thereon that, when executed by the RBridge, cause the RBridge to:
   detect a change in network topology;
   in response to detecting the change in network topology, execute the STP that converges with a logical port of the RBridge transitioning from a designated forwarding state to a root blocking state;
   if the RBridge is an appointed forwarder, un-assign the RBridge as the appointed forwarder; and
   upon un-assigning the RBridge, transmit a Hello protocol message indicating that the RBridge is not the appointed forwarder.

16. The non-transient computer-readable medium of claim 13, having further computer-executable instructions stored thereon that, when executed by the RBridge, cause the RBridge to:
   detect a change in network topology;
   in response to detecting the change in network topology, execute the STP that converges with a logical port of the RBridge remaining in a root blocking state and a change in spanning tree root bridge;
   if the RBridge is an appointed forwarder, un-assign the RBridge as the appointed forwarder; and
   upon un-assigning the RBridge, transmit a Hello protocol message indicating that the RBridge is not the appointed forwarder.

17. A cloud switch domain for rapid Transparent Interconnect of Lots of Links (TRILL) convergence in a cloud networking environment having a plurality of cloud switch domains, comprising:
   a plurality of RBridges that are operably connected to form the cloud switch domain, at least one of the RBridges comprising:
      a processing unit; and
      a memory communicatively connected to the processing unit, the memory storing computer-executable instructions thereon that, when executed by the processing unit, cause the processing unit to:
         execute a spanning tree protocol (STP) for network topology;
         execute a Hello protocol for control and forwarding, the Hello protocol being configured to elect a designated RBridge and assign an appointed forwarder; and
         during a period of time between convergence of the STP and convergence of the Hello protocol, assign a transient appointed forwarder, the transient appointed forwarder being configured to forward frames in the network during the period of time.

18. The cloud switch domain of claim 17, wherein the memory has further computer-executable instructions stored thereon that, when executed by the processing unit, cause the processing unit to, upon convergence of the Hello protocol, confirm that the transient appointed forwarder is the assigned appointed forwarder or un-assign the transient appointed forwarder.

19. The cloud switch domain of claim 17, wherein the memory has further computer-executable instructions stored thereon for assigning a transient appointed forwarder that, when executed by the processing unit, cause the processing unit to:

transmit a bridge protocol data unit (BPDU); and receive one or more BPDUs from one or more of the plurality of cloud switch domains, wherein each BPDU comprises a pseudo root bridge identifier, and the transient appointed forwarder is a cloud switch domain having a highest root bridge priority based on the one or more BPDUs.

20. The cloud switch domain of claim 17, wherein the memory has further computer-executable instructions stored thereon that, when executed by the processing unit, cause the processing unit to transmit a Hello protocol message including an integration Type-Length-Value (TLV) indicating an appointed forwarder status.

* * * * *